(12) United States Patent
Jacoby et al.

(10) Patent No.: US 6,843,352 B2
(45) Date of Patent: Jan. 18, 2005

(54) TWO STAGE SHOCK ABSORBER MOUNT

(75) Inventors: Mark F Jacoby, Waterford, MI (US); Kelly J Reynolds, Allegan, MI (US); James M Stevens, Livonia, MI (US); Timothy S O'Bryan, Sterling Heights, MI (US); Phillip C Boss, South Haven, MI (US)

(73) Assignees: DaimlerChrysler Corporation, Auburn Hills, MI (US); Trelleborg Corporation, Bloomfield Hills, MI (US)

( * ) Notice: Subject to any disclaimer, the term of this patent is extended or adjusted under 35 U.S.C. 154(b) by 0 days.

(21) Appl. No.: 10/443,164

(22) Filed: May 22, 2003

(65) Prior Publication Data
US 2004/0231936 A1 Nov. 25, 2004

(51) Int. Cl.⁷ .................................................. F16F 9/00
(52) U.S. Cl. ...................... 188/321.11; 280/124.147; 280/124.155; 267/202; 267/209; 267/220; 267/33
(58) Field of Search ................ 280/124.147, 124.155; 267/195, 202, 209, 216, 219, 220, 221, 224, 225, 226, 33, 34, 35; 188/321.11

(56) References Cited

U.S. PATENT DOCUMENTS

| 4,211,429 A | * | 7/1980 | Howard | 280/14.162 |
|---|---|---|---|---|
| 4,290,626 A | | 9/1981 | Sullivan, Jr. et al. | |
| 4,434,977 A | * | 3/1984 | Chiba et al. | 267/33 |
| 4,462,608 A | | 7/1984 | Lederman | |
| 4,771,996 A | | 9/1988 | Martinez, Jr. et al. | |
| 4,798,370 A | | 1/1989 | Inuzuka | |
| 5,009,401 A | * | 4/1991 | Weitzenhof | 267/64.21 |
| 5,133,573 A | | 7/1992 | Kijima et al. | |
| 5,628,388 A | | 5/1997 | Angermann | |
| 5,664,650 A | | 9/1997 | Kammel et al. | |
| 5,788,262 A | | 8/1998 | Dazy et al. | |
| 6,427,814 B1 | * | 8/2002 | Miyamoto | 188/321.11 |
| 2002/0113398 A1 | * | 8/2002 | Berner | 280/124.155 |

FOREIGN PATENT DOCUMENTS

JP 355140607 * 11/1980

* cited by examiner

*Primary Examiner*—Jack Lavinder
*Assistant Examiner*—Devon Kramer
(74) *Attorney, Agent, or Firm*—Ralph E. Smith

(57) ABSTRACT

A shear mount assembly and a compression mount assembly are combined to control ride harshness of a shock absorber. The shock absorber includes a body and a shock rod having a hydraulically sealed portion within the body and a distally extending free portion. A mount assembly is connected at the free portion having both a compression mount and a shear mount therein. The shear mount absorbs low-input vertical loads transferred from the shock rod, and the compression mount limits vertical displacement of the shear mount and absorbs a medium-input vertical load. The shear mount and the compression mount are tuned by selecting the durometer, dimensions, and physical configuration of each mount.

7 Claims, 5 Drawing Sheets

TWO STAGE SHOCK ABSORBER MOUNT

FIELD OF THE INVENTION

The present invention relates in general to shock absorbers and more specifically to motor vehicle shock absorbers.

BACKGROUND OF THE INVENTION

Shock absorber shear mounts are intended to isolate the shock rod loads from the vehicle. The challenge for a shear mount design is to provide flexibility to tune a soft rate for ride feel without compromising durability of the shear mount. Common shear mount designs rarely achieve the balance of smooth ride feel and durability of the shear mount.

Shear mounts are normally used to absorb low amplitude loads transferred between the shock rod and the vehicle. Common shear mounts are bonded to surfaces adjacent to the shock rod and are capable of absorbing low amplitude shock motion. In order to provide for a soft ride feel, it is desirable to reduce the durometer or hardness of the resilient elements used to form the shear mount. The disadvantage of reducing the durometer of this material is that the durability is reduced. Common shear mounts having durometer values providing for increased durability do not provide a soft ride feel. Increasing the size of the shear mount to provide a greater extended operating range has the disadvantage of increased weight, cost, and space envelope for the shock absorber.

It is therefore desirable to provide a shock absorber design which is capable of providing both a soft ride feel and durability for the shock absorber.

SUMMARY OF THE INVENTION

A shear mount assembly and a compression mount assembly are combined to control ride harshness of a shock absorber. The shock absorber includes a body and a shock rod having a hydraulically sealed portion within the body and a distally extending free portion. A mount assembly is connected at the free portion having both a compression mount and a shear mount therein. The shear mount absorbs low-input vertical loads transferred from the shock rod, and the compression mount both limits vertical displacement of the shear mount to prevent damaging the shear mount and absorbs a medium-input vertical load.

The shear mount and the compression mount are tuned by changing mount durometer, mount thickness, and/or mount diameter. The shear mount can be made softer than the compression mount to provide a softer ride feel. The shear mount initially deflects from a shock rod displacement prior to initial displacement of the compression mount, therefore low amplitude loads are absorbed by the shear mount before they can be transferred through the compression mount. The compression mount will not engage until after the shear mount has partially progressed through its rate curve. The compression mount thereafter gradually builds up in compression force to isolate medium-amplitude shock rod inputs. A travel limiter plate joined to the compression mount prevents both over-compression of the compression mount and tearing of the shear mount material.

Further areas of applicability of the present invention will become apparent from the detailed description provided hereinafter. It should be understood that the detailed description and specific examples, while indicating exemplary preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
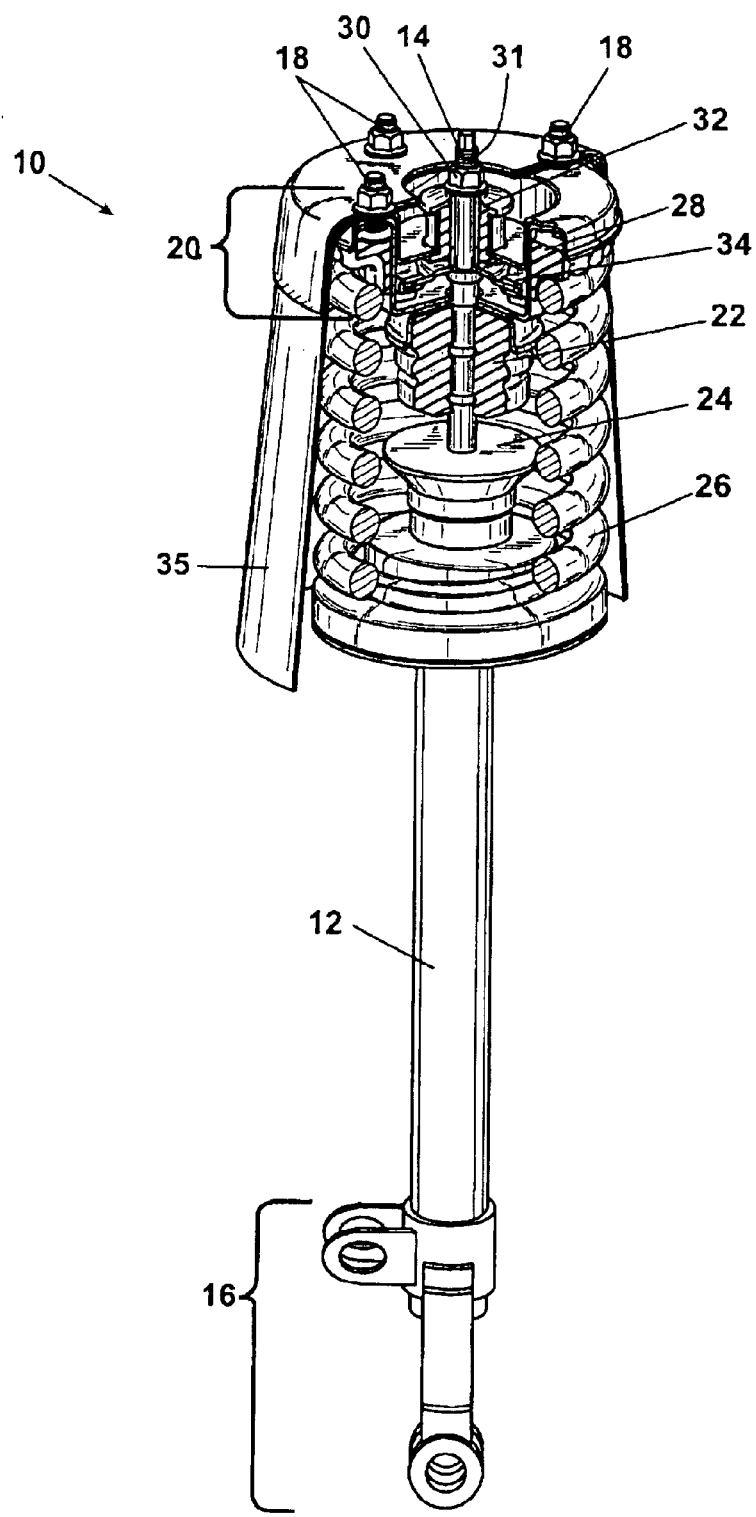
FIG. 1 is perspective view of a shock absorber mount having the combined shear and compression mounts according to the invention.

Referring to FIG. 1, a shock absorber 10 according to a preferred embodiment of the present invention includes a shock absorber body 12 having a shock rod 14 extending from a first end of the shock absorber body 12. The shock rod 14 has a partial length disposed and hydraulically dampened within the shock absorber body 12, and a free length distally extending from the shock absorber body 12. At a second end of the shock absorber body 12, an attachment 16 is provided. The attachment 16 is known in the art and commonly includes a single piece casting providing a clevis bracket and fastener apertures to clamp the shock absorber body 12 to a vehicle control arm bushing (not shown). A mount assembly 20 is disposed at a distal end of the shock rod 14 free length. A plurality of fasteners 18 extend from the mount assembly 20. The fasteners 18 are used to mount the shock absorber 10 to a vehicle 35 (shown cut-away).

As known in the art, a jounce bumper 22 is provided adjacent to the mount assembly 20. High amplitude loads from the shock body 12 are transferred to the jounce bumper 22 via a striker 24. A spring 26 is retained adjacent to the mount assembly 20 by a spring isolator 28. The spring 26 provides force to return the shock absorber 10 to a null position following a load input. A preload fastener 30 connectably joins the mount assembly 20 to the shock absorber 10 via a threaded surface 31 of the shock rod 14.

According to a preferred embodiment of the present invention, a shear mount assembly 32 and a compression mount assembly 34 are provided with the mount assembly 20. The compression mount assembly 34 absorbs medium amplitude (input) loads from the shock rod 14, and the shear mount assembly 32 absorbs low amplitude (input) loads from the shock rod 14. The jounce bumper 22 is provided independent from the mount assembly 20 to absorb high amplitude (input) loads from the shock body 12.

Figure 2:
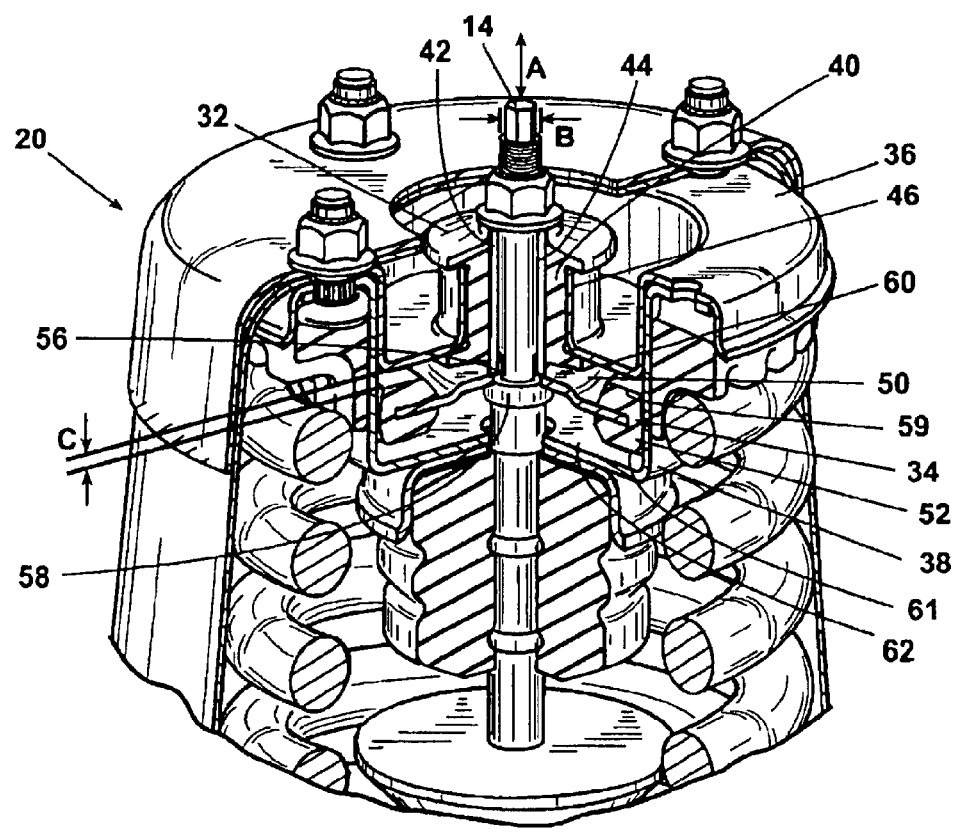
FIG. 2 is an enlarged perspective view of the shock absorber mount shown in FIG. 1.

Referring to FIG. 2, the mount assembly 20 is shown in greater detail. The mount assembly 20 further includes an upper stamping 36 and a lower stamping 38. The upper stamping 36 and the lower stamping 38 house both the shear mount assembly 32 and the compression mount assembly 34. The shear mount assembly 32 is formed by bonding a shear mount 40 on an inner diameter to an outer diameter of an inner sleeve 42. The inner sleeve 42 has an aperture 44 longitudinally disposed there-through to provide radial clearance about the shock rod 14. An outer diameter of the shear mount 40 is bonded to a first cylinder 46 formed in the upper stamping 36.

The compression mount assembly 34 includes a travel limiter plate 50 slidably disposed within a slot formed in and/or bonded to a resilient element 52. The travel limiter plate 50 and the resilient element 52 together form the compression mount assembly 34. A ferrule 56 formed at one end of the travel limiter plate 50 is disposed within the aperture 44 and immediately adjacent to the shock rod 14. The ferrule 56 slidably adjoins the shock rod 14.

A shoulder 58 is machined, welded, or otherwise provided on the shock rod 14. The shoulder 58 contacts an undersurface of the travel limiter plate 50 adjacent to the ferrule 56. The shock rod 14 is driven in the shock rod deflection directions "A" such that a vertical upward motion (if oriented as shown in FIG. 2) forces the shoulder 58 into contact with the travel limiter plate 50 and the inner sleeve 42. Low amplitude vertical inputs from the shock rod 14 are first absorbed by deflection of the shear mount 40. In an exemplary embodiment, the shear mount 40 will upwardly deflect approximately 2 mm before the resilient element 52 begins to compress. An upper surface 59 of the resilient element 52 contacts an underside of an inner horizontal surface 60 of the upper stamping 36 after the approximate 2 mm deflection of the shear mount 40. The resilient element 52 can deflect a maximum amount of approximately 8–10 mm. The total deflection of the shear mount 40 is therefore approximately 10 mm to 12 !mm from a non-deflected state to a fully deflected state. During this upward motion along the shock rod deflection axis "A", the ferrule 56 of the travel limiter plate 50 translates upon the shock rod diameter "B". The clearance between the travel limiter plate 50 and the inner horizontal surface 60 provides an allowable displacement "C" of approximately 10–12 mm. This displacement protects the shear mount 40 from excessive deflection which could damage the shear mount 40. This displacement also includes a maximum compression of the resilient element 52.

A similar clearance of approximately 10–12 mm is provided between a lower surface 61 of the resilient element 52 and a lower stamping plate 62. This clearance prevents the ferrule 56 from sliding free from the aperture 44 when the shoulder 58 travels in a downward direction along the shock rod deflection axis "A".

Figure 3:
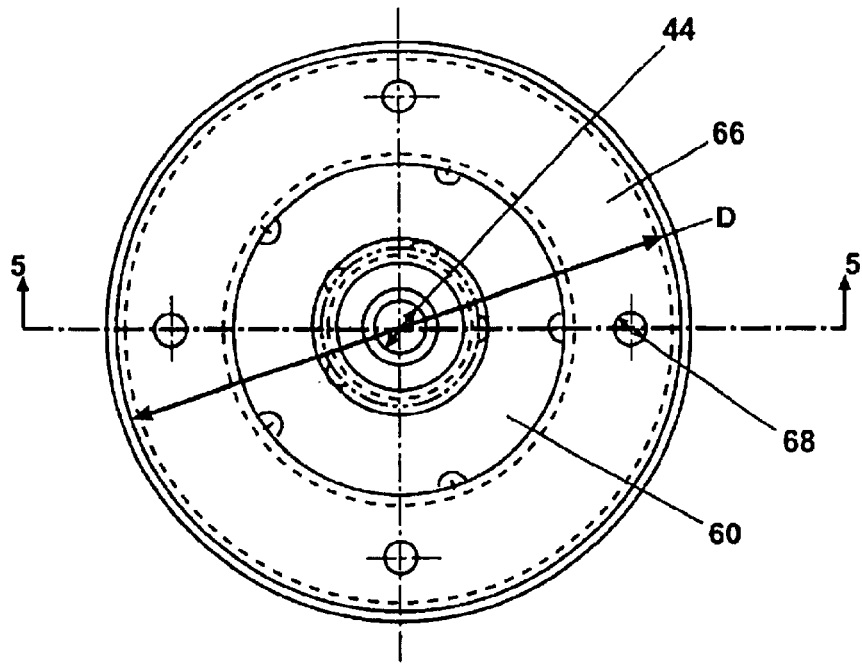
FIG. 3 is a plan view of an upper stamping containing a shear mount of the invention of FIGS. 1–2.
Figure 4:
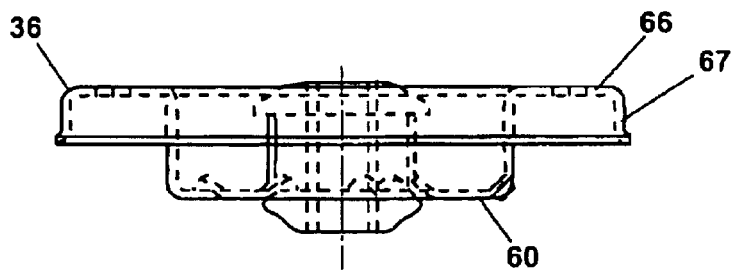
FIG. 4 is a side view of the upper stamping of FIG. 3.
Figure 5:
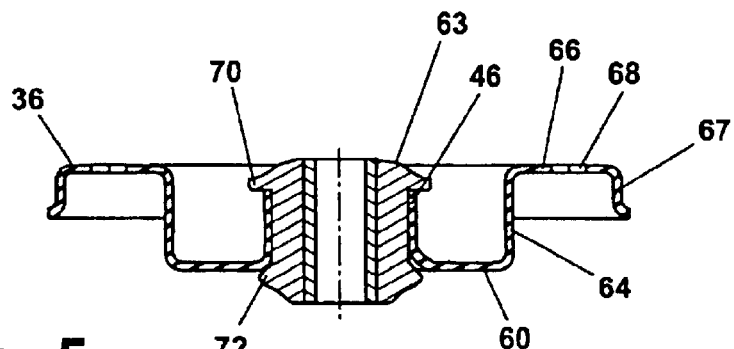
FIG. 5 is a cross-sectional view taken through line 5—5 of FIG. 3.

Referring to FIGS. 3–5, an alternate embodiment of a shear mount 63 connected to the upper stamping 36 is shown. The shear mount 63 can be bonded to the first cylinder 46 similar to the shear mount 40 or can be press fit into the first cylinder 46. In the embodiment shown, the shear mount 63 is also provided with an upper extension ring 70 and a lower extension ring 72 to hold the shear mount 63 at the junction with the first cylinder 46. The aperture 44 is similarly provided within the shear mount 63 to provide clearance about the shock rod diameter "B" of the shock rod 14 (shown in FIG. 2).

As best seen in FIG. 5, the upper stamping 36 includes the first cylinder 46, the inner horizontal surface 60, a second cylinder 64, and an outer horizontal plate 66. As best seen in FIG. 3, a plurality of apertures 68 is formed in the outer horizontal plate 66. The apertures 68 locate the fasteners 18 (shown in FIG. 1). A peripheral skirt 67 forms an outer perimeter for the upper stamping 36. The spring isolator 28 (shown in FIG. 1) is disposed between the second cylinder 64 and the skirt 67. The upper stamping 36 has an upper stamping diameter "D" as shown in FIG. 3.

Figure 6:
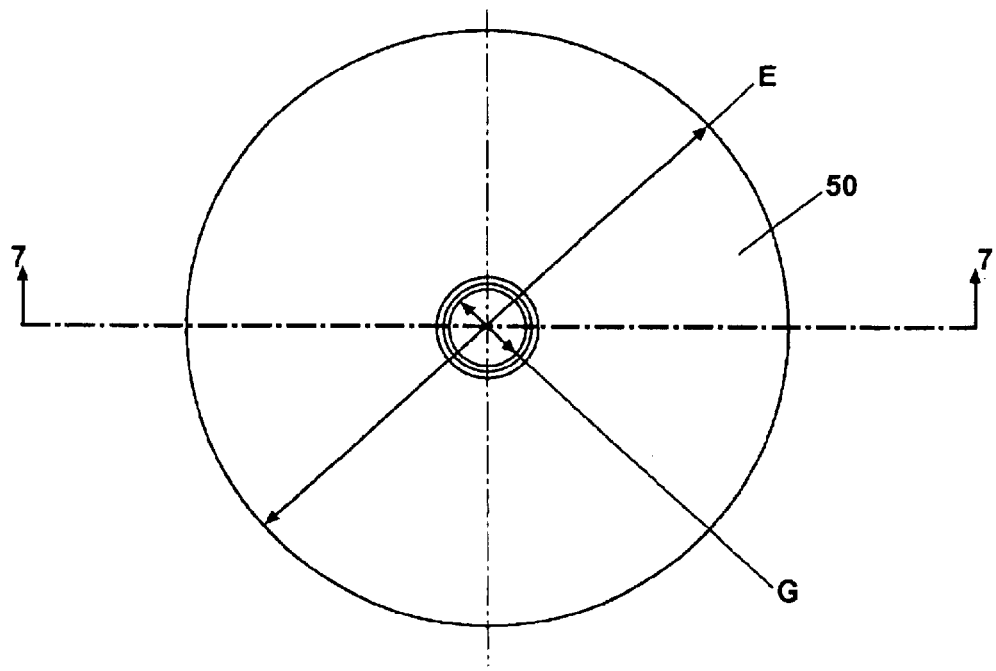
FIG. 6 is plan view of a travel limiter plate of the shock absorber mount of FIGS. 1–5.
Figure 7:
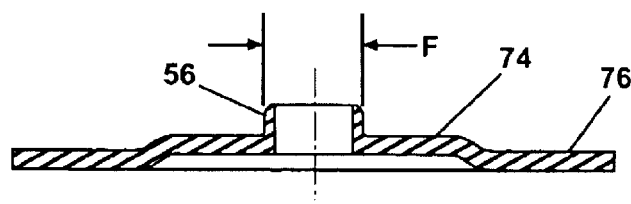
FIG. 7 is a cross-sectional view of the travel limiter plate shown in FIG. 6 taken through line 7—7 of FIG. 6.

Referring to FIGS. 6 and 7, the travel limiter plate 50 is further detailed. The travel limiter plate 50 has a travel limiter plate diameter "E". The ferrule 56 has a ferrule outer diameter "F" which slidably mates within the aperture 44 of the inner sleeve 42 (shown in FIG. 2). A raised face 74 is provided to align the resilient element 52 between the travel limiter plate 50 and the inner horizontal surface 60 to establish the allowable deflection "C" (shown in FIG. 2). The resilient element 52 (shown in FIG. 2) is bonded to a bonding surface 76 radially disposed on the travel limiter plate 50. The travel limiter plate diameter "E" is selected such that an outer diameter of the resilient element 52 is controlled to extend beyond the travel limiter plate diameter "E" when the resilient element 52 is installed on the travel limiter plate 50. FIG. 6 further shows that a ferrule inner diameter "G" is provided. The ferrule inner diameter "G" is sized to provide a sliding fit between the travel limiter plate 50 and the shock rod 14 about the shock rod diameter "B".

Figure 8:
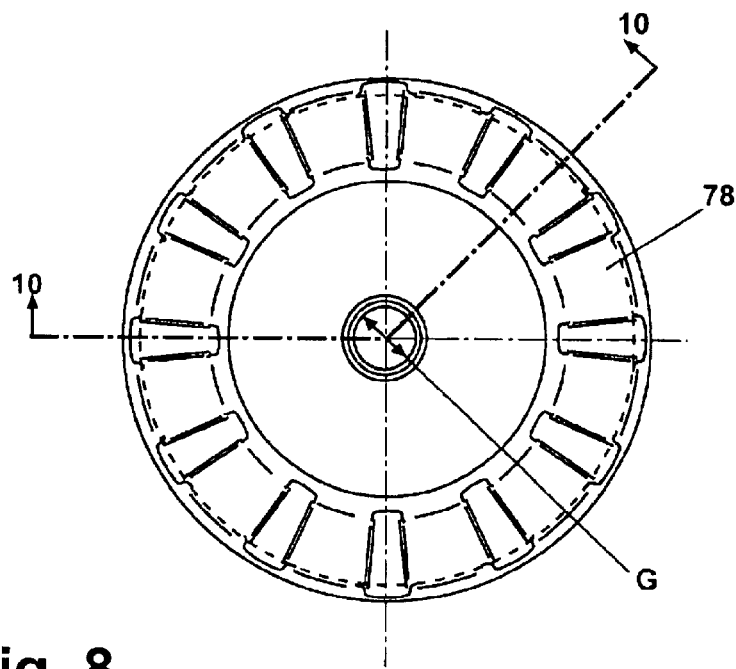
FIG. 8 is a plan view of an alternate embodiment of a resilient element of the present invention bonded to a travel limiter plate.
Figure 9:
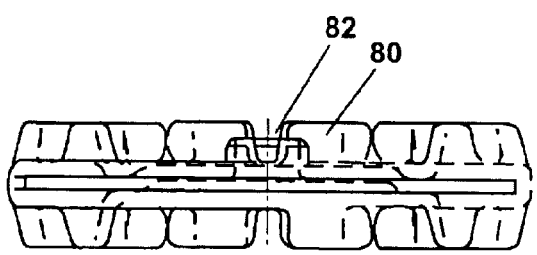
FIG. 9 is a side view of the resilient element of FIG. 8.
Figure 10:
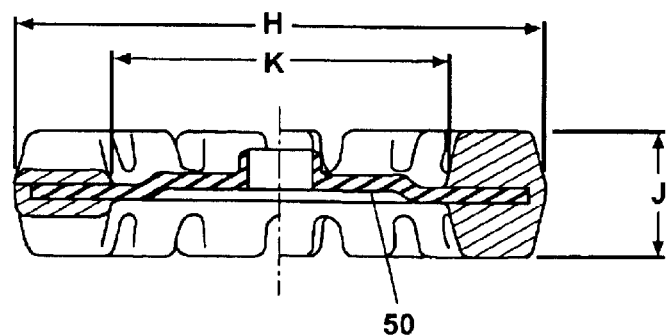
FIG. 10 is a cross-sectional view taken through line 10 of FIG. 8.

Referring to FIGS. 8–10, an alternate embodiment for a resilient element 78 is shown. The resilient element 78 differs from the resilient element 52 (shown in FIG. 2) by the alternating use of ridges 80 and grooves 82. The ridges 80 and the grooves 82 allow radial expansion of the resilient element 78 when it is compressed. The resilient element 78 is bonded to the travel limiter plate 50 and provides the ferrule inner diameter "G" as previously discussed. A resilient element outer diameter "H", a resilient element thickness J, and a resilient element inner diameter "K" are also shown. These diameters and thicknesses are similar between the resilient element 78 and the resilient element 52.

Material for the shear mount 40, the shear mount 63, the resilient element 52, and the resilient element 78 can be rubber or similar elastomeric compounds having a shore-D durometer ranging from approximately 45 to approximately 75. In a preferred embodiment, the materials of the shear mount have a lower durometer than the material of the compression mount. By providing a softer material for the shear mount, the shock absorber 10 can be tuned to provide a softer ride for the low amplitude vertical loads imparted by the shock rod 14. A softer material used for the shear mount isolates small inputs to make them transparent to a vehicle operator. The compression mount assembly 34 does not engage until after the shear mount has partially progressed through its rate curve. The compression mount assembly then works in compression and gradually builds up its rate to isolate larger vertical inputs (i.e., medium amplitude inputs). The jounce bumper 22 (shown in FIG. 1) absorbs high amplitude vertical inputs after both the shear mount and the resilient element reach their maximum deflection.

The material selected for the shear mounts and the compression mounts of the present invention can also be selected to have the same durometer. It is known that increasing the durometer for the mounts increases durability, at the expense of ride feel. A softer material used for the mounts decreases durability but provides an overall softer ride feel. The choice of shear mount and compression mount material durometer is therefore a design issue depending upon several factors including the vehicle weight, the envelope available for the shock absorber 10, and the magnitude of the loads the shock absorber 10 must absorb. The shear mount can be tuned by changing at least one of a diameter, a length, and a durometer. The compression mount can be tuned by changing at least one of a thickness, a surface geometry, and a durometer. In a preferred mode of assembly, the compression mount assembly is press fit into the lower stamping 38. This provides additional damping and resistance to deflection for the travel limiter plate 50. In another embodiment of the present invention, the diameter of the resilient element (i.e., the resilient element outer diameter "H" shown in FIG. 10) can be reduced to provide clearance to the lower stamping 38.

A shock absorber of the present invention provides the following advantages. By providing separate shear mount and compression mount assemblies, low amplitude loads such as small bumps and stones in a vehicle's path can be absorbed by the shear mount assembly prior to deflection of the compression mount. By using a softer material for the shear mount, the low amplitude loads can be absorbed with little or no transfer of energy to a driver of the vehicle. By providing a separate compression mount from the shear mount assembly, the compression mount can absorb a medium amplitude input and also provide a positive stop to prevent tear out or shear of the shear mount assembly. By providing a separate shear mount and compression mount, either or both mounts can be tuned by adjusting size and/or durometer to change the ride feel of the shock absorber.

The material for the travel limiter plate is preferably of a high strength steel for resistance to permanent deflection and to absorb impact loads. Alternate materials such as corrosion resistant steels, aluminum, etc. can also be substituted if strength is similar to the high strength steels. Materials for the stampings, the spring, the shock rod, the fasteners, and the jounce bumper of the shock absorber of the present invention are known in the art. Only a portion of the spring 26 is shown for clarity, as its attachment to the shock absorber body 12 is known. Additional skirts or covers provided to protect the shock absorber 10 of the present invention from water, dirt or road debris are also known and are therefore not shown for clarity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle shock absorber comprising:
    a shock absorber body having a shock rod displacement end and a support end;
    a shock rod partially disposed within said shock rod displacement end of said shock absorber body, including a hydraulically sealed portion disposed in said shock absorber body and a distally extending free portion; and
    a mount assembly connectably disposed at said free portion having both a compression mount and a shear mount disposed therein;
    said compression mount further comprising:
    a travel limiter plate; and
    a resilient element horizontally extending from said travel limiter plate, and
    said shear mount further comprising:
    a generally tubular shear mount body disposed on said shock rod;
    and a pair of conical ends extending longitudinally from said shear mount body, wherein said shear mount operably absorbs a low-input vertical load transferable via said shock rod to the vehicle and said compression mount operably limits a vertical displacement of said shear mount and absorbs a medium-input vertical load transferable via said shock rod,
    said mount assembly further comprising:
    an inner metal sleeve having a sleeve outer diameter bonded to an inner diameter of said tubular shear mount body, and a sleeve inner diameter slidably disposed on an outer diameter of said shock rod;
    an upper mount plate having a plurality of sequentially arranged vertical and horizontal plate surfaces, including:
    one of said vertical plate surfaces being bonded to an outer diameter of said shear mount body; and
    one of said horizontal plate surfaces operably providing an upper travel limit for said resilient element of said compression mount; and a lower stamping slidably joined to said upper mount plate, said lower stamping operably providing a lower travel limit for said resilient element of said compression mount; and
    wherein said shock rod further comprises:
    a shoulder to transfer said low-input vertical load and said medium-input vertical load from said shock rod to said inner metal sleeve of said shear mount to said compression mount; and a threaded distal end at said shock rod free portion for connectably disposing a preload fastener.

2. A combined shear and compression mount assembly for a shock absorber comprising:
    an upper stamping having an inner cylinder and an outer cylinder;
    a shear mount bonded to said inner cylinder;
    a reinforcement ring enclosing both said inner cylinder and said shear mount;
    a lower stamping having an outer surface butted to said outer cylinder of said upper stamping and an inner surface shaped to form an inner cavity between said upper stamping and said lower stamping; and
    a compression mount assembly disposed within said inner cavity.

3. The assembly of claim 2, further comprising an aperture disposed through both said shear mount and said compression mount assembly to slidably receive a shock rod of said shock absorber.

4. The assembly of claim 3, wherein said compression mount assembly further comprises:
    a travel limiter plate having a ferrule end slidably disposed in said aperture adjacent to said shear mount, a raised surface and a horizontally extending bonding surface; and
    a resilient element having a receiving slot to matably receive said horizontally extending bonding surface of said travel limiter plate;
    wherein said compression mount assembly is slidably disposed on said shock rod such that said resilient element axially displaces along said shock rod between contact positions with one of said upper stamping and said lower stamping.

5. The assembly of claim 4, wherein said resilient element of said compression mount assembly further comprises:
- a first surface contacting said upper stamping during travel in a first compression mount deflection direction; and
- a second surface contacting said lower stamping in a second compression mount deflection direction.

6. The assembly of claim 3, further comprising:
- a sleeve bonded an inner surface of said shear mount within said aperture.

7. The assembly of claim 2, further comprising:
- said shear mount having an allowable deflection distance varying between a nominal, non-deflected position and a maximum allowable longitudinally deflected position; and
- said raised surface of said travel limiter plate providing a travel limit clearance between said resilient element and said upper stamping;
- wherein said travel limit clearance is predetermined to equate to said allowable deflection distance of said shear mount in a shear mount deflection direction.

\* \* \* \* \*